United States Patent
Cole et al.

(10) Patent No.: US 9,582,539 B1
(45) Date of Patent: Feb. 28, 2017

(54) OPTIMIZING DATABASE QUERIES USING REUSABLE SUBQUERIES

(71) Applicant: ParAccel, Inc., Campbell, CA (US)

(72) Inventors: Richard L. Cole, Los Gatos, CA (US); Yijou Chen, Cupertino, CA (US); William J. McKenna, Oceanside, CA (US); Sergei Perfilov, San Jose, CA (US); Aman Sinha, San Jose, CA (US); Eugene Szedenits, Jr., Ypsilanti, MI (US)

(73) Assignee: ParAccel, Inc., Campbell, CA (US)

( * ) Notice: Subject to any disclaimer, the term of this patent is extended or adjusted under 35 U.S.C. 154(b) by 151 days.

(21) Appl. No.: 13/799,051

(22) Filed: Mar. 13, 2013

Related U.S. Application Data

(60) Provisional application No. 61/643,054, filed on May 4, 2012.

(51) Int. Cl.
  *G06F 17/30* (2006.01)
(52) U.S. Cl.
  CPC .............. *G06F 17/30451* (2013.01)
(58) Field of Classification Search
  CPC ......... G06F 17/30463; G06F 17/30433; G06F 17/30474
  USPC .......................................... 707/718, 999.004
  See application file for complete search history.

(56) References Cited

U.S. PATENT DOCUMENTS

| | | | |
|---|---|---|---|
| 5,412,804 A | 5/1995 | Krishna | |
| 5,668,987 A * | 9/1997 | Schneider | ............ G06F 12/0802 |
| 5,724,570 A | 3/1998 | Zeller et al. | |
| 6,370,524 B1 | 4/2002 | Witkowski | |
| 2004/0220911 A1 | 11/2004 | Zuzarte et al. | |
| 2005/0010570 A1 | 1/2005 | Styles | |
| 2005/0283471 A1* | 12/2005 | Ahmed | ............. G06F 17/30979 |
| 2006/0101011 A1* | 5/2006 | Lindsay | ............ G06F 17/30454 |
| 2007/0130110 A1 | 6/2007 | Graefe et al. | |
| 2008/0109424 A1* | 5/2008 | Day | ................. G06F 17/30477 |

(Continued)

OTHER PUBLICATIONS

"SQL Order BY", Refsnes Data, http://www.w3schools.com/sql/sql_orderby.asp.*

(Continued)

*Primary Examiner* — Hosain Alam
*Assistant Examiner* — Robert F May
(74) *Attorney, Agent, or Firm* — Fenwick & West LLP

(57) ABSTRACT

A database system optimizes database queries that comprise subqueries. The database system factors out computation from two or more subqueries to a reusable subquery. The reusable subquery returns a result set. The subqueries are rewritten to use the result set and the database query modified to use the rewritten subqueries. The modified database query performs efficiently since the result set is computed only once for each subquery that uses the reusable query. The database system also composes nested subqueries that compute aggregate values. The database system identifies an inner subquery nested within an outer subquery, each subquery computing an aggregate value. The database system determines a new aggregate function corresponding to a composition of aggregate functions of the inner and the outer queries. The database system determines a composed query using the inner query with the outer query. The composed query uses the new aggregate function.

20 Claims, 4 Drawing Sheets

(56) References Cited

U.S. PATENT DOCUMENTS

2009/0055349 A1     2/2009  Ahmed
2009/0132474 A1*    5/2009  Ma .................... G06F 17/30451
2013/0173590 A1*    7/2013  Ghazal .............. G06F 17/30483
                                                           707/714

OTHER PUBLICATIONS

Chaudhuri, S. et al., "Iincluding Group-By in Query Optimization," VLDB '94 Proceedings of the 20$^{th}$ International Conference on Very Large Data Bases, 1994, pp. 354-366.
Dayal, U. et al., "Of Nests and Trees: A Unified Approach to Processing Queries That Contain Nested Subqueries, Aggregates, and Quantifiers," VLDB '87 Proceedings of the 13$^{th}$ International Conference on Very Large Data Bases, 1987, pp. 197-208.

* cited by examiner

OPTIMIZING DATABASE QUERIES USING REUSABLE SUBQUERIES

CROSS REFERENCE TO RELATED APPLICATION

This application claims the benefit of U.S. Provisional Patent Application 61/643,054, entitled "Optimizing Database Queries Based on Expression Composition," filed on May 4, 2012, which is incorporated by reference in its entirety.

FIELD OF ART

The disclosure generally relates to optimization of database queries by identifying subqueries and eliminating computation duplicated across subqueries.

BACKGROUND

Enterprises often store their data in databases. For example, an enterprise may store information describing employees, customers, products, financial transactions, and the like in databases. These databases provide functionality for managing data including updates to the data as well as querying the data. Databases typically support standard interfaces that allow an end user to access the data. Most databases support the structured query language (SQL) for manipulating and accessing data.

The database query languages allow users to functionally express the desired result. These database query languages typically hide the details of how the database system processes the data to compute the results of the query. Database systems attempt to optimize the statements provided by the users to efficiently execute the query. However, users often provide complex database queries that the database system is unable to optimize effectively. If the database system is unable to effectively optimize a query, the queries can perform very inefficiently. As a result, the applications relying on these queries also perform poorly.

SUMMARY

Embodiments of the invention optimize database queries by identifying matching subqueries in a database query and expressing the subqueries in terms of a reusable query. The reusable query factors out a portion of the computation that is common between two or more subqueries. As a result, the computation is performed once instead of being repeated by each subquery.

The database system receives a query that comprises multiple subqueries. The database system matches the subqueries to identify a first and a second subquery that are equivalent. The queries are determined to be equivalent based on matching of certain portions of the subqueries, for example, the input tables processed by each subquery. The database system determines a reusable query based on the subqueries. The reusable query returns a result table. The subqueries are expressed as expressions using the result table. The input database query is rewritten in terms of the expressions. The database system executes the reusable query to store the results in the result table and then executes the database query that uses the result table.

In an embodiment, the first subquery returns a first set of columns and the second subquery returns a second set of columns. The database system determines a reusable query that returns a union of the first set of columns and the second set of columns. The expression corresponding to the first subquery selects the first set of columns from the result table and the expression corresponding to the second subquery selects the second set of columns from the result table. In another embodiment, the database query has two subqueries that are identical. In this situation, the reusable query is identical to the database queries and the expressions corresponding to the subqueries simply return the result table.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Users of database query languages often provide complex and detailed specification based on query languages to specify the tasks that they want the database system to perform. For example, database administrators or other users often provide scripts written using query languages that can be very long and specify several queries for execution by databases. The queries can also be provided by an application invoking a programmable interface of the database system, for example, JDBC (Java Database Connectivity). These queries provided by a user often reuse code, for example, expressions or subqueries. A subquery may be used multiple times within a larger query. Often the subquery may be reused but modified for different contexts. This makes it difficult to recognize that two subqueries are equivalent. The presence of multiple subqueries may result in suboptimal plan generation for the query since the number of terms in the query becomes large. As a result, the number of factors considered by the optimizer for optimizing the query becomes large and the optimizer may not be able to identify certain optimizations.

Embodiments identify matching subqueries within a larger query that are equivalent and generate a reusable query that performs a computation common to the matching subqueries. The subqueries are written in terms of the result of the reusable query. The query is modified to reuse the result of the reusable query for multiple subqueries. This results in significant improvement in the performance of the query. The execution of the query is efficient because the subqueries don't duplicate the computation performed by the reusable query. Furthermore, the input query gets simplified and the optimizer is more likely to generate an optimal plan for executing the overall query. The subqueries identified are also referred to as common subexpressions or common subqueries since they have at least a part of computation in common. The terms expression, subquery, and subexpression may be used interchangeably in the description herein unless the context indicates otherwise.

System Architecture

Figure 1:
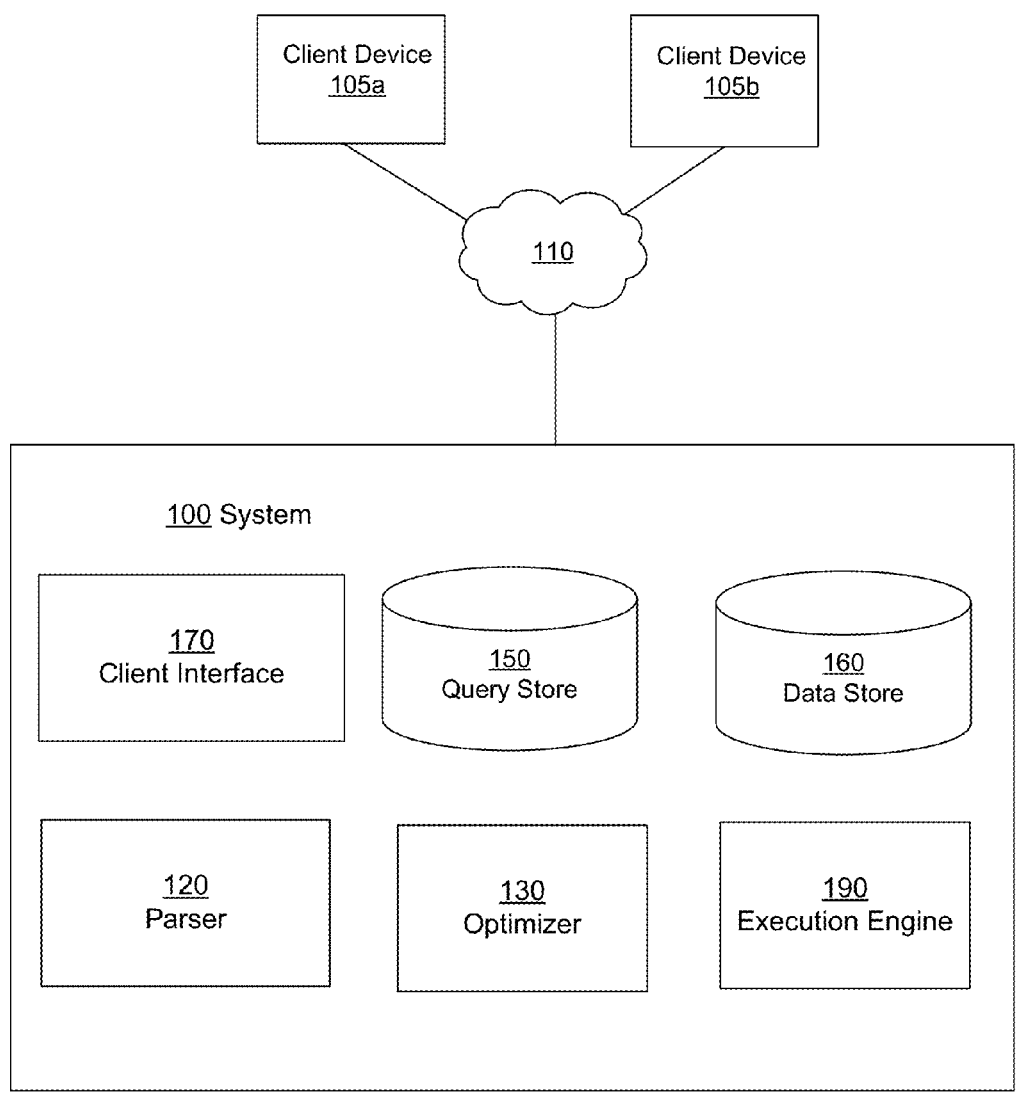
FIG. 1 describes various components of a system configured to process user defined functions in accordance with an embodiment of the invention.

FIG. 1 describes various components of a system configured to process user defined functions in accordance with an embodiment of the invention. The system 100 includes a client interface 170, a parser 120, an optimizer 130, a query store 150, an execution engine 190, and a data store 160. The system 100 is also referred to herein as a database system 100. In some embodiments, the system 100 is a parallel database system that executes database queries using multiple processors.

In some embodiments, the system 100 may include additional, fewer, or different modules for various applications. Conventional components such as network interfaces, security mechanisms, load balancers, failover servers, management and network operations consoles, and the like are not shown so as to not obscure the details of the system. (A letter after a reference numeral, such as "105a," indicates that the text refers specifically to the element having that particular reference numeral, while a reference numeral in the text without a following letter, such as "105," refers to any or all of the elements in the figures bearing that reference numeral.)

The data store 160 stores data comprising information including user data and metadata describing the database. In an embodiment, the data store 160 is represented as a relational database but can be represented as any other form of data store. User data stored in the data store 160 comprises application specific information, for example, tables storing data describing employees, customers, sales, and so on. The data store 160 also stores metadata, for example, information describing various configuration parameters of the database, structure of the different schemas and tables of the database and so on.

In an embodiment, the system 100 provides an interface to allow the users to access the data stored in the data store 160, for example, a structured query language (SQL) interface. The query store stores queries defined by the user that are executed in response to user requests. In an embodiment, the queries are received from the client device and executed on the fly. The parser 120 analyzes the syntax of information represented as a language.

The optimizer 130 optimizes execution of the database queries. The optimizer 130 may rewrite the queries such that the rewritten query executes more efficiently. The optimizations disclosed include the optimization described herein, for example, generation of reusable queries, aggregate view composition, and so on. In an embodiment, the optimizer 130 may include various sub-modules (not shown in FIG. 1), for example, a module for matching subqueries, a module for generating reusable queries, a module for composing queries, and a module for determining aggregate functions equivalent to a composition of two aggregate functions.

The execution engine 190 executes the database queries. Typically, the optimizer performs optimizations to input queries and the execution engine 190 executes the optimized queries. The result of the executed queries is returned by the system 100 to the client that sent the queries. The client interface 170 provides the libraries that interact with the client devices 105 and allow the client devices to access the data stored in the system 100.

In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. The interactions between the client devices 105 and the system 100 are typically performed via a network 110, for example, via the internet.

The network 110 enables communications between the client device 105 and the system 100. In one embodiment, the network 110 uses standard communications technologies and/or protocols. In another embodiment, the entities can use custom and/or dedicated data communications technologies instead of, or in addition to, the ones described above. Depending upon the embodiment, the network 110 can also include links to other networks such as the Internet.

Overall Process of Determining Reusable Queries

Figure 2:
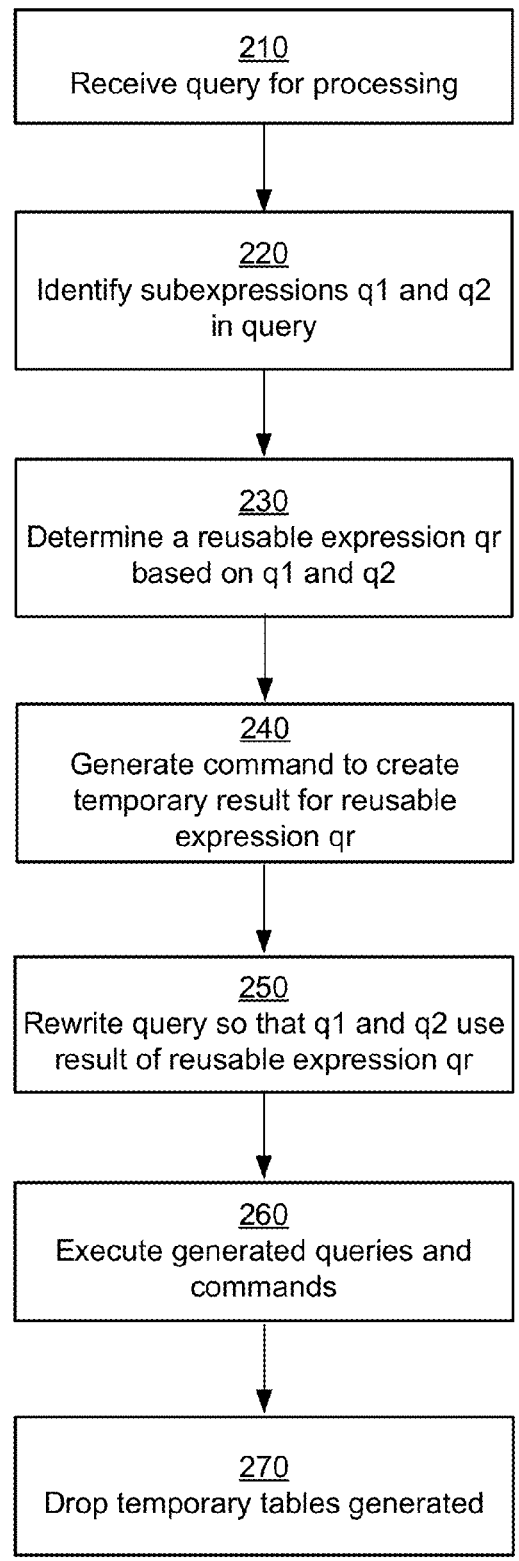
FIG. 2 illustrates the process for optimizing queries so as to utilize reusable expressions in accordance with an embodiment.

FIG. 2 illustrates the process for optimizing queries so as to utilize reusable expressions in accordance with an embodiment. Steps of the process described herein may be executed by the optimizer 130 or other modules. The system 100 receives 210 a query for execution. A query includes various portions including a set of input data, for example, tables, a join clause relating the tables, a where clause specifying the subset of the input that is processed, select clause specifying the set of values returned by the query, a group by clause for grouping the results, and so on. A query may include some of the clauses and not others. A table comprises columns storing data of a particular type. A table can be viewed as rows of data where a row may include an element for each column.

The parser 120 parses the query and represents the query in the form of a parse tree. The optimizer 130 identifies 220 subqueries q1 and q2 that are similar or have at least a portion of computation that is common. The optimizer compares the inputs of the two subqueries to verify that the inputs match. The optimizer may order the inputs based on a predetermined sort order to match the two inputs. For example, the optimizer may order the inputs based on an alphabetical order of the database tables corresponding to the inputs or based on an identifier corresponding to the tables used by the database system. The optimizer may compare expressions used within each subquery by transforming the expressions to a canonical form. The expression comparison may be used to compare where clause expressions or expressions used in any other portion of the subqueries.

The optimizer determines 230 a reusable query qr based on the subqueries q1 and q2. If the subqueries q1 and q2 have the same set of inputs, the reusable query qr also has The same set of inputs. If the subqueries q1 and q2 have the same where clause, the reusable query qr also has the same where clause. If the where clauses for q1 and q2 are different, the subquery qr is generated with a where clause that returns a super set of the where clause of q1 and q2. For example, if the where clause of q1 returns a first subset of the inputs and the where clause of q2 returns a second subset of the inputs, the where clause of qr is specified to return a superset of the first and second subset.

The optimizer generates 240 commands to create results for the reusable query. The results of the reusable query may be stored as a temporary table. In an embodiment, the results of the reusable memory are stored and processed in memory without having to be stored on a persistent storage. The commands generated can be SQL statements. The optimizer rewrites 250 the input query such that the subqueries q1 and q2 use the result of the reusable expression qr. The optimizer generates SQL for the final query. The execution engine 190 sequentially executes 260 the above commands instead of executing the input database query. The commands may benefit from any statistics derived from the instantiated temporary tables. The execution engine 190 drops 270 the temporary tables that store the result of the reusable expression.

The above process describes a SQL-to-SQL transformation approach with very low overhead, even for complex queries with several thousand lines of formatted SQL text. The approach described herein is advantageous over cost-based optimization of reusable expressions. The advantages of this rewrite approach are that it is not subject to inaccuracies in statistics or intermediate result estimates, requires no costing, has low overhead, is relatively low risk, is easily integrated with other rule-driven rewrites, and results in referencing expressions optimized using the benefits inherent in instantiating intermediate results. Heuristics based on row counts or costing could also be applied.

Following is an example of a query where reusable expressions are utilized to improve the query execution. The input script defines a view revenue0 as follows. On execution, the view returns a single column supplier_no as the result.

CREATE VIEW revenue0 AS
      SELECT suppkey as supplier_no, function(extendedprice) AS total_revenue
      FROM lineitem
      WHERE shipdate>='1996-01-01'::date AND shipdate<'1996-04-01'::date
      GROUP BY suppkey;

The view revenue0 is used twice in the following query, once as part of a subquery within the WHERE clause and once as part of the FROM clause for the overall query. Note that revenue0 is a non-composable view in both contexts of the following query. In other words it cannot be combined with its containing block to produce a single block.

SELECT s.s_suppkey, s.s_name, s.s_address, s.s_phone, r.total_revenue
    FROM supplier s, revenue0 r
    WHERE s_suppkey=supplier_no
    AND total_revenue=(SELECT max(total_revenue) FROM)revenue0
    ORDER BY s_suppkey;

Embodiments identify this reusable expression and transform the query into one or more SQL statements that compute the reusable expression only once. As a result optimization based on the embodiments result in improved performance. Embodiments can detect reusable expression even in situations where query compilers support column elimination. For example, in one invocation of the subquery, the result rowset contains supplier_no and total_revenue while in the other invocation of the subquery, only total_revenue is required. In this situation, the embodiments determine the overall set of values that need to be computed by the reusable expression that is factored out so that the various subqueries can all be satisfied.

Applying optimization based on reusable expressions to the above query produces the following temp table and rewritten query and the result rowset for revenue0 is only computed once.

CREATE TEMP TABLE tt_0(suppkey, col1) AS
    SELECT suppkey, function(extendedprice)
    FROM lineitem
    WHERE shipdate<date '1996-04-01' AND shipdate>=date '1996-01-01'
    GROUP BY 1;

The above temp table is used in the query as follows.

SELECT s.s_suppkey, s.s_name, s.s_address, s.s_phone, revenue0.total_revenue
    FROM supplier s, (
      SELECT tt_0.suppkey, tt_0.col1 FROM tt_0
    ) AS revenue0 (supplier_no, total_revenue)
    WHERE s.s_suppkey=revenue0.supplier_no
    AND revenue0.total_revenue=(
      SELECT MAX(revenue0.total_revenue) AS max
      FROM (SELECT tt_0.col1 FROM tt_0) AS revenue0
        (total_revenue))
    ORDER BY 1;

In this embodiment, the optimizer 130 determines that a first subquery and a second subquery within a query are identical. For example, an SQL query may include two subqueries q1 and q2 that are determined to be identical. In this case, the optimizer 130 generates a reusable expression that is identical to either one of q1 and q2. Once the value of the reusable expression is determined, the result is stored in a temporary table and used during evaluation of the overall query. In this case, the result set computed using the reusable expression can be substituted in place of the first and second subexpression. As a result, the computation corresponding to the two subqueries is performed only once even though the query included two occurrences of the subquery.

In an embodiment, the database system does not rely on auxiliary data structures such as indexes or materialized views; therefore, the need for a strictly cost-based solution for this use case is reduced. A rewritten query optimized using reusable expressions is only competing with the plan generated for the original query and the overall search space is relatively smaller in this regard versus systems with auxiliary structures.

In another example, an SQL query includes query q1 and q2 that are identical except that query q1 performs a "group by" operation based on a first set of columns and the query q2 performs the group by based on a second set of columns. In this case, the reusable query is identical to the queries q1 and q2 except for the group by clause. The group by clause of the reusable expression is based on a set of columns obtained by taking a union of the first set of columns and the second set of columns. For example, if query q1 performs a "group by column1" and query q2 performs "group by column2," the reusable expression may execute a similar query that performs "group by column1, column2." The result of the reusable expression is stored in a temporary table. The evaluation of the reusable query evaluates a result that can be considered partial result towards evaluation of queries q1 and q2, thereby simplifying the evaluation of queries q1 and q2. The result of individual query q1 may be obtained by performing a "group by column 1" on the result of the reusable expression. Similarly, the result of the individual query q2 is obtained by performing a "group by column 2" on the result of the reusable expression.

As another example, query q1 performs "group by column1, column2" and query q2 performs "group by column1." The reusable expression may be identical to q1. The result of the reusable query is stored in a temporary table. Query q2 may be evaluated by performing a "group by column 1" on the result of the reusable query. Since the evaluation of the reusable query evaluates a result that can be considered partial result towards evaluation of query q2, evaluation of query q2 is simplified. This is so because performing a group by operation on column1 given that the input is already grouped by column1 and column2 requires less computation compared to than performing group by from the original source.

In some embodiments the first and second subexpression may not belong to the same query but be part of a set of queries that are evaluated together, for example, as a script. For efficiency purposes, the temporary table described in the above examples may be stored in memory rather than on secondary storage, e.g., disk.

In other embodiments, the two subqueries identified within a query may not be identical in terms of the columns returned by the queries. Embodiments can generate reusable expressions from subqueries where all non-SELECT list expressions match but the final output expressions differ. For example, an SQL query includes query q1 and q2 that are identical except for the columns in the SELECT clause. The subquery q1 selects a first set of columns from the tables joined within q1 and subquery q2 selects a second set of columns from the same set of tables joined in the same way as q1. In this case, the optimizer 130 generates a reusable query that performs a join of the same set of tables in a way identical to q1 or q2 and selects set of columns obtained by taking a union of the first and second set of columns. The result of the reusable query is stored in a temporary table and subquery q1 is determined by selecting the first set of columns from the temporary table and the subquery q2 is determined by selecting the second set of columns from the temporary table.

In an embodiment, the two subexpressions are similar in various respects but have a different "where" clause that determines a subset of the result that is considered. For example, subexpression q1 has a where clause where1 and subexpression q2 has a where clause where2. If the optimizer determines that where1 clause generates a subset of input values that is a superset of the subset generated by where2, the optimizer generates the reusable expression as a query with where clause where1. For example, if where1 specifies a condition (column1<20) and where2 specific condition (column1<10), the subset generated by where1 is a superset of the subset generated by where2 since all values of column1 that satisfy (column1<20) also satisfy the condition (column1<10). Accordingly, the computation of the subexpression q2 is simplified due to the availability of the results of the reusable expression because it has to compute a subset from a much smaller input. In general, the where clause of the reusable expression can be any expression that generates a superset of all the subexpression that are going to use the result of the reusable expression. Accordingly, the where clause of the reusable expression can be different from the where clause of each of the subexpression queries.

In an embodiment, the availability of intermediate results as temporary tables allows the database system to collect statistics describing the intermediate results and user the information for optimizing the overall query. For example, the optimizer may not be able to effectively perform several optimizations in a complex query due to lack of statistics describing intermediate results. However, the optimization described herein store the intermediate results as temporary tables that allow the optimizer to collect statistics that can be used for optimizing execution of the query, for example, for subsequent executions of the query. For example, the size of the temporary tables may be used to rearrange order in which joins are executed.

In an embodiment, the optimizer analyzes information regarding use of the results of the reusable query by the overall query to determine if the reusable query can be further modified to improve the overall performance. For example, if the results of both the subexpressions are ordered by a particular column, the optimizer generates the reusable expression such that the results generated are ordered by that particular column. As a result, the order by computation is performed only once for the reusable expression and are not performed twice, once for each subexpression.

Matching Expressions

The optimizer determines all common subqueries in a SQL statement by identifying all SELECT blocks in the statements and treating each SELECT block as a subquery. A block is a portion of the select statement that itself can be represented as a subquery. The optimizer creates equivalence classes based on the subqueries identified. In an embodiment, the optimizer compares each subquery with the subqueries identified so far. If the subquery matches an existing subquery, the optimizer adds the two subqueries to the same equivalence class. If the subquery doesn't match any existing query, the optimizer creates a new equivalence class for the subquery.

In an embodiment, the optimizer identifies common subqueries are identified by making a single pass over a SQL statement and inserting all SELECT blocks into an instance of the optimizer class EquivalenceClassSet. An EquivalenceClassSet is a set of equivalence classes instantiated with two functors that define a hash value for expressions inserted into the set (the hash functor) and also describe how to determine if two expressions are considered equal (the equality functor). Any two blocks that have the same hash value and for which the equality functor returns "true" defines an equivalence class in the EquivalenceClassSet.

For reusable expression optimization, the SELECT lists of candidate blocks need not match, such that the equality functor only compares expressions not in the SELECT list. In an embodiment, the optimizer compares two expression by matching the structures corresponding to the expression. These structures may be represented as logical algebra expressions where a SQL SELECT clause is represented by multiple logical operators, e.g., Projection, Window (if window functions are present), and Aggregation (if aggregate or grouping expressions are present). The equality functor compares all expressions not in the top-most Projection. Accordingly, two subqueries may be determined to be equivalent even if their SELECT column list does not match, i.e., a first subquery selects a first set of columns but the other subquery selects another set of columns. The class that represents a SELECT block in the optimizer maintains a set of canonically ordered lists, i.e., for the FROM clause, the WHERE clause. Accordingly, the order in which the original subquery lists the terms being matched becomes immaterial. Similarly, expressions in the WHERE clause are transformed to a canonical form so that textual variations in the way the WHERE clauses are specified become immaterial and the expressions are compared on a semantic basis.

After all blocks are inserted into the EquivalenceClassSet instance, all equivalent blocks will be in the same equivalence class. Each equivalence class with greater than one member is then processed and an applicability functor is invoked to determine if a member block will be considered a candidate subexpression. In general, a block is a candidate subexpression if it is not composable, i.e., cannot be merged into its containing block. Also, each candidate preferably has at least one of a DISTINCT, GROUP BY, aggregation, window function, or has at least one predicate and a connected join graph. These factors are considered to avoid materializing subexpressions that obviously do not improve performance.

Rewriting, Subsumption, and Roll-up

Matching and rewriting proceed bottom-up and continue until no more candidate subexpressions are found. For each equivalence class, a candidate subexpression is defined whose SELECT list is the union of all member SELECT lists. A temporary table is defined for the reusable expression and each member block is rewritten in terms of the temporary table. A block is not rewritten until all descendent candidate blocks are processed.

This method of common subexpression analysis can produce temporary tables that do not represent common subexpressions in the final rewritten query, because a common child block can be subsumed by a common ancestor block. A final post-processing pass is made to roll-up, i.e., compose or fold these temporary tables into their referencing blocks.

Figure 3:
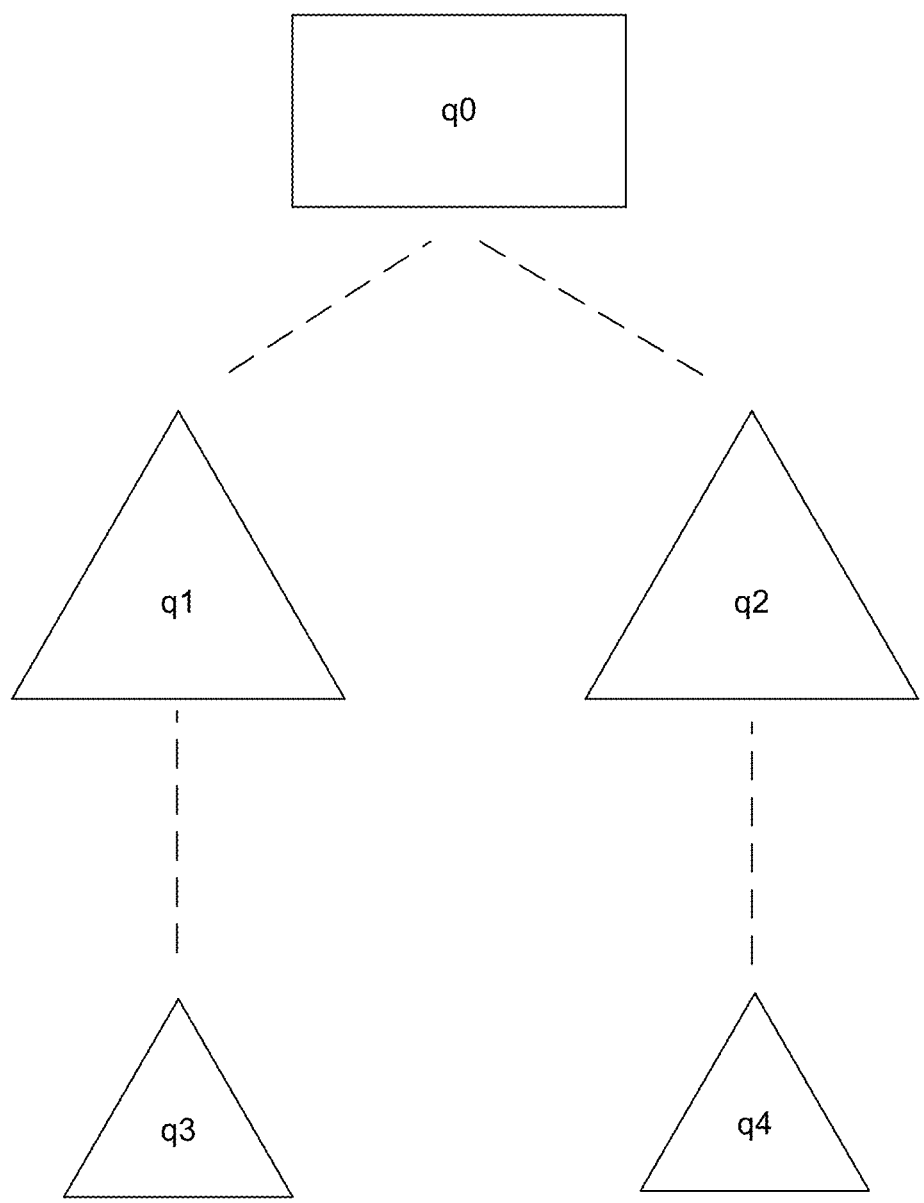
FIG. 3 illustrates a scenario in which the optimizer may determine that there is no advantage to creating a temporary table for storing result of a common subexpression, in accordance with an embodiment.

FIG. 3 illustrates a scenario in which the optimizer may determine that there is no advantage to creating a temporary table for storing result of a common subexpression, in accordance with an embodiment. FIG. 3 illustrates a query q0 that is received by the system 100 for analysis and execution. The optimizer identifies that subexpressions q1 and q2 are identical and can be represented by a reusable query qr1. The optimizer also identifies that subexpressions q3 and q4 are identical and can be represented by a reusable query qr2. If the optimizer did not analyze interactions across subexpressions, the optimizer may generate a temporary table for storing the results of qr2. However, the optimizer determines that the result of the subexpression q3 is consumed by the subexpression q1 and the result of the subexpression q4 is consumed by the subexpression q2. Since q1 and q2 are represented by a single reusable expression qr1, the result of qr2 is consumed by a single expression qr1. Accordingly there is no advantage to storing the result of qr2 in a temporary table because there is a single consumer of the result and there is no reuse. Accordingly, the optimizer determines that the result of reusable expression qr2 is not stored in a temporary table.

Statistics are collected on each temporary table when it is produced, so the physical planning of the rewritten query can benefit. In fact, all of the mechanisms used in the common subexpression optimization can be applied to optimize queries containing joins or other operations for which there is low confidence in the accuracy of the result cardinality estimation, by materializing these intermediate expressions in temporary tables, collecting statistics, and optimizing for exact, rather than estimated, results. This approach provides an aspect of robustness when common subexpressions are used in a query; in contrast to using plans based on one pass of query optimization, or attempting to conditionally re-optimize the referencing plans. In an embodiment, a temporary table may be used to materialize a subexpression that is not reused, but in order to determine the exact intermediate result cardinality and compute accurate statistics, to the benefit of the input query.

Embodiments leverage SQL rewriting capabilities of a database query optimizer framework to effectively utilize reusable expressions. Query rewriting offers an efficient and effective alternative approach to optimizing deeply nested, non-trivial reusable expressions, which are often present in complex big data analytics. This approach could also be easily extended to consider appropriate heuristics or even full costing of potential reusable subexpressions.

Embodiments can be applied for optimizing queries encountered in several domains. For example, database users often use business intelligence (BI) tools that generate complex queries using common sub-blocks corresponding to nested business objects. Users also often use nested views where the top level view is referenced multiple times. As business intelligence analytics become ever more complex, a primary theme of big data analytics, simple yet effective reusable expression optimization becomes a significant query optimization technique. For example, complex mortgage analytics across multiple data sources, with multiple financial securities, across multiple geographies, industry sectors, and so on, often have deeply nested, non-trivial subexpressions that are candidates for reusable expression optimization.

Composition of Database Queries

In an embodiment, a database query is optimized by composing subqueries within the database query. Database query languages, e.g., structured query language SQL support various constructs that allow users to specify the requested data as well as operations on the requested data. For example, SQL allows a user to perform aggregate operations on specific columns of tables. Examples of aggregate operations include sum (adding a set of values), max (determining maximum of a set of values), min (determining minimum of a set of values). The description herein refers to SQL as an example database query language but the concepts discussed are applicable to any other type of database query language. Query composition is also referred to herein as aggregate view composition.

Providing complex queries to certain optimization stages of the optimizer can result in a very slow performance of the optimizer (and the optimizer may not even be able to perform several optimizations due to the complexity of the query). For example, given a nested query that includes subqueries, the optimizer may not be able to perform optimizations that it would normally perform on a simple query. View composition replaces nested queries with a simple query (which is not nested.) Replacing a complex nested query with a simple query presents the remaining stages of the optimizer with a simplified query that is easier for the optimizer to handle.

Query composition allows optimization of database queries statements that are formed by composition of multiple SQL statements and compute aggregate values based on columns. For example, query composition can be used to optimize SELECT statements with aggregation (and possibly grouping) defined on columns of a derived table that correspond to aggregate expressions to be rewritten as a single SELECT block. The aggregate expressions in the containing block can appear in any valid context, and are not limited to the SELECT list, e.g. the aggregate expressions can appear in a HAVING clause.

Some examples are as follows. The following query includes a nested query such that the inner query ("SELECT SUM(a1) AS x FROM t1 GROUP BY b1") computes a sum of a column a1 when the values are grouped by another column b1 and returns the sum values as values x. The outer query ("SELECT SUM(x) FROM . . . ") determines a sum of the values x returned by the inner query.

SELECT SUM(x) FROM (SELECT SUM(a1) AS x FROM t1 GROUP BY b1)

Query composition optimizes this query to generate the following query that returns the sum of the column a1.

SELECT SUM(a1) FROM t1;

This optimization is based on the observation that the aggregate operation SUM of a SUM of terms is still a SUM operation. However not all compositions of aggregate operations result in the same aggregate operation, i.e., f(f(x)) is not always f(x) when f is an aggregate operation.

The following query includes a nested query such that the inner query determines a count of values in column c1 when the rows are grouped by two other columns a1 and b1. The outer query determines the sum of the count values returned by the inner query.

SELECT x, SUM (z) FROM
   (SELECT a1, b1, COUNT (c1) FROM t1 GROUP BY a1, b1)
     as DT(x, y, z) GROUP BY x;

This query can be optimized to generate the following query that returns the count of the column c1 when the rows are grouped by a1.

SELECT a1 AS x, COUNT(c1) FROM t1 GROUP BY a1;

This example illustrates that the aggregate composition SUM(COUNT(x)) results in the aggregate operation COUNT(x) provided the outer query is grouped by a subset of the columns that the inner query is grouped by.

If the outer query computes MAX of a column and the inner query contains MAX of that column, the aggregate composition MAX(MAX(x)) results in MAX(x) provided the outer query is grouped by a subset of the columns that the inner query is grouped by.

If the outer query computes MIN of a column and the inner query contains MIN of that column, the aggregate composition MIN(MIN(x)) results in MIN(x) provided the outer query is grouped by a subset of the columns that the inner query is grouped by.

Figure 4:
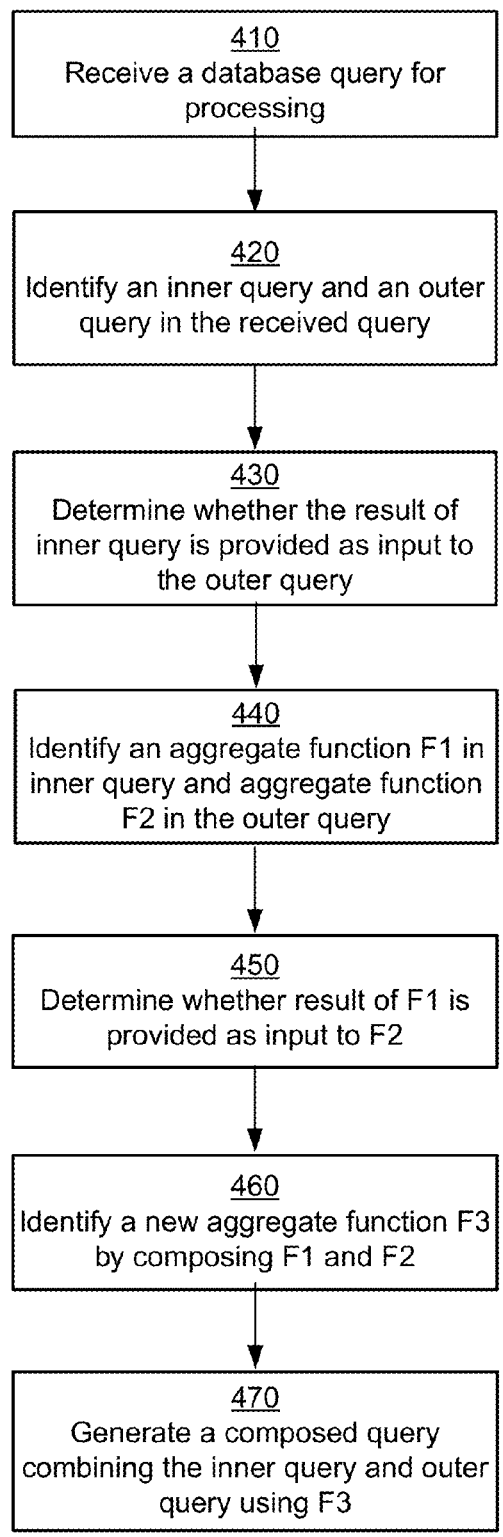
FIG. 4 illustrates the process for optimizing queries so as to compose subqueries of the query in accordance with an embodiment.

FIG. 4 illustrates the process for optimizing queries so as to compose subqueries of the query in accordance with an embodiment. The optimizer 130 receives 410 a database query for processing. The optimizer 130 identifies 420 an inner subquery and an outer subquery within the received database query. The optimizer determines 430 whether the result of the inner subquery is provided as input to the outer subquery. If the result of the inner subquery is provided as input to the outer subquery, the optimizer 130 determines that the inner query and the outer query can be composed. The optimizer 130 identifies 440 an aggregate function F1 in the inner subquery and an aggregate function F2 in the outer subquery. The optimizer 130 determines whether the result of F1 is provided as input to F2 in the received database query. If the result of F1 is provided as input to F2 in the received database query, the optimizer 130 determines that the aggregate functions F1 and F2 can be composed. The optimizer 130 identifies a new aggregate function F3 by composing the functions F1 and F2. The optimizer generates a new combined query that corresponds to a composition of the inner subquery and the outer subquery. The combined query uses the new aggregate function F3. The optimizer 130 stores the combined query as an optimized version of the received database query.

In an embodiment, the optimizer 130 maintains a mapping from combinations of aggregate functions to a new aggregate function corresponding to a composition of the input aggregate functions. For example, the mapping may be implemented as a mapping table that maps a first aggregate function and a second aggregate function to a third aggregate function that corresponds to an aggregate function obtained by composing the first and the second aggregate function. The optimizer 130 looks up the mapping table to identify 460 the new aggregate function.

Embodiments compose other types of subqueries. The following query includes a nested query within the WHERE clause of the outer query. The WHERE clause compares the value of a3 with a nested query.

SELECT unn3 FROM t3
   WHERE a3<(SELECT MAX(y) FROM
     (SELECT a1, MAX(b1) AS y FROM t1 GROUP BY a1))

This query can be optimized to generate the following query that has the inner query optimized to a non-nested query.

SELECT unn3 AS unn3 FROM t3 WHERE a3<(SELECT MAX(b1) AS max FROM t1);

Some aggregates computed at a coarser granularity from aggregates computed at a finer granularity can be computed directly from the input to the finer granularity computation thus avoiding the unnecessary intermediate computation.

The elimination of a derived table by combining it with its containing block is called query composition, or view composition, or view folding. In an embodiment, query composition is performed when the derived table and its containing block contain grouping and/or aggregation. The motivation for query composition is improved performance, in particular for certain complex queries. Query composition can be used to optimize complex queries such that they perform as if they were written against the base table rather than a view or nested subselect.

In an embodiment, if the outer query returns a subset of result values that is returned by the inner query, the combined query obtained by composing the two queries returns only the results returned by the outer query. For example, if the inner query specifies a WHERE clause that computes a first subset of a set of values and the outer query specifies a WHERE clause that computes a second subset of the set of values. If the optimizer determines that the second subset is a subset of the first subset of values, the optimizer uses the where clause of the outer query as the where clause of the combined query. The composed query is more efficient since it does not have to determine the intermediate subset before determining the final subset.

In another embodiment, if the inner query orders the results returned by a first set of columns and the outer query orders the results by a second set of columns, the combined query obtained by composing the two queries orders the results on the second set of columns.

The compositions of queries can be performed even if there are several levels of nested queries. For example, if there is a five level nested query, each level including a SUM of column x, these queries can be combined to generate a single combined query with a SUM of the column.

The queries may not be explicitly nested when specified but rather specified as views. For example, a first query may be defined as a first view and a second query may be defined using the first view as one of the input tables. In some applications, there can be several levels of views that are nested. For example view1 defined as a query using a table as input, view2 defined as a query using view1 as input, view3 defined as a query using view2 as input, and so on for several levels. The composition of these queries can be performed independent of the fact that they are provided as views or as nested queries.

In an embodiment, the optimizer determines that the query composition optimization can be performed if the columns in the GROUP BY expression of the outer query form a subset of the columns in the GROUP BY expression of the inner query. If there is no GROUP BY expression in a query, the set of columns is assumed to be an empty set.

In an embodiment, the query composition is performed on queries containing WHERE clauses if they are defined on GROUP BY expressions of the derived table. In other words the WHERE clause of the containing query contains variables that are defined in (and returned by) the derived table.

In an embodiment, the optimizer determines that the subqueries in a query are not composed for purposed of optimization if there are certain types of expressions involved in the inner or the outer queries. In particular, since these expressions result in complex processing for purposes of query composition. In an embodiment, the optimizer determines that query composition is not performed on an input query if it contains blocks that contain correlation at any level. The optimizer checks if the containing block's grouping expressions include expressions or constants. If the containing block's grouping expressions include expressions or constants, the optimizer determines that query composition is not performed on such queries. In these embodiments, the optimizer ensures that to perform query composition on an input query, the containing block's grouping expressions must be derived table columns only, not expressions or constants. This rule is applicable only if the derived table is the only table in the FROM clause of the containing block. However, the derived table can contain more than one table.

In an embodiment, the optimizer determines that no query composition is performed if either the inner or the outer query block contains DISTINCT aggregates. Similarly, the optimizer determines that no aggregate view composition is performed if COUNT(*) is a containing block aggregate.

In an embodiment, aggregate view composition is not performed if the derived table contains one or more of clauses DISTINCT, HAVING, ORDER BY, or window functions. The rule is applied bottom-up so a sequence of nested derived tables can be collapsed into a single block by repeated application of the rule. A window function belongs to a type of function known as a 'set function', which means a function that applies to a set of rows. The term 'window' refers to the set of rows that the function works on.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method for optimizing database queries, the method comprising:
receiving, by a database system, a database query for optimization, the database query comprising a first subquery and a second subquery, the first subquery specifying a first where clause comprising a first condition and the second subquery specifying a second where clause comprising a second condition, wherein the first where clause is distinct from the second where clause and wherein the first condition evaluates to true for a first set of input rows and the second condition evaluates to true for a second set of input rows;
comparing the first subquery and the second subquery based on input tables processed by each of the first and second subqueries;
responsive to determining that the first subquery and the second subquery match based on the comparison:
generating a first database query specifying a where clause comprising a condition that evaluates to true for a superset of the first set of input rows and the second set of input rows;
generating a statement comprising the first database query, the statement storing result of execution of the first database query in a result table;
generating a first expression equivalent to the first subquery and a second expression equivalent to the second subquery, the first and the second expressions based on the result table;
modifying the database query to use the result table, the modifying comprising, replacing the first subquery with the first expression and the second subquery with the second expression; and replacing an execution of the database query with an execution of the statement followed by an execution of the modified database query.

2. The method of claim 1, wherein the first subquery returns a first set of columns and the second subquery returns a second set of columns, wherein the first database query returns a union of the first and second set of columns.

3. The method of claim 1, wherein the first subquery includes a group by clause based on a first set of columns and the second subquery includes a group by clause based on a second set of columns, wherein generating the statement comprises:
determining a union of the first set of columns and the second set of columns; and
adding a group by clause to the first database query to group the result of the first database query by the union of the first and second set of columns.

4. The method of claim 3, wherein the first expression is a query with the result table as input and a group by clause based on the first set of columns and the second expression is a query with the result table as input and a group by clause based on the second set of columns.

5. The method of claim 1, wherein the first expression is a query with the result table as input and the first where clause and the second expression is a query with the result table as input and the second where clause.

6. The method of claim 1, wherein the first subquery specifies an order by clause and the second subquery also specifies the order by clause, wherein generating the statement comprises generating a query having the order by clause.

7. The method of claim 1, further comprising:
identifying a third subquery matching a fourth subquery;
determining that the result of the third subquery is consumed by the first subquery and the result of the fourth subquery is consumed by the second subquery; and
responsive to determining that the result of the third subquery is consumed by the first subquery and the result of the fourth subquery is consumed by the second subquery, excluding the third subquery and the fourth subquery from subqueries rewritten using reusable queries.

8. The method of claim 1, further comprising:
performing statistical analysis of the result table to determine statistical information describing the result table; and
using the statistical information of the result table to optimize the database query execution.

9. The method of claim 1, wherein the database system is a parallel system, further comprising:
specifying a distribution of the result table based on a distribution of input tables of the database query.

10. A non-transitory computer-readable storage medium storing computer-executable code for optimizing queries of a database system, the code, when executed by a processor, causing the processor to:
receive a database query for optimization, the database query comprising a first subquery and a second subquery, the first subquery specifying a first where clause comprising a first condition and the second subquery specifying a second where clause comprising a second condition, wherein the first where clause is distinct from the second where clause and wherein the first condition evaluates to true for a first set of input rows and the second condition evaluates to true for a second set of input rows;
compare the first subquery and the second subquery based on input tables processed by each of the first and second subqueries;
responsive to determining that the first subquery and the second subquery match based on the comparison:
generate a first database query specifying a where clause comprising a condition that evaluates to true for a superset of the first set of input rows and the second set of input rows;
generate a statement comprising the first database query, the statement storing result of execution of the first database query in a result table;
generate a first expression equivalent to the first subquery and a second expression equivalent to the second subquery, the first and the second expressions based on the result table;
modify the database query to use the result table, the modifying comprising, replacing the first subquery with the first expression and the second subquery with the second expression; and
replace an execution of the database query with an execution of the statement followed by an execution of the modified database query.

11. The computer-readable storage medium of claim 10, wherein the first subquery returns a first set of columns and the second subquery returns a second set of columns, wherein the first database query returns a union of the first and second set of columns.

12. The computer-readable storage medium of claim 10, wherein the first subquery includes a group by clause based on a first set of columns and the second subquery includes a group by clause based on a second set of columns, wherein generating the statement comprises:
determining a union of the first set of columns and the second set of columns; and
adding a group by clause to a query of the statement to group the result of the query by the union of the first and second set of columns.

13. A computer-implemented system for optimizing queries, the system comprising:
a computer processor; and
a non-transitory computer-readable storage medium storing computer program modules configured to execute on the computer processor, the computer program modules comprising:
an optimizer module configured to:
receive a database query for optimization, the database query comprising a first subquery and a second subquery, the first subquery specifying a first where clause comprising a first condition and the second subquery specifying a second where clause comprising a second condition, wherein the first where clause is distinct from the second where clause and wherein the first condition evaluates to true for a first set of input rows and the second condition evaluates to true for a second set of input rows;
compare the first subquery and the second subquery based on input tables processed by each of the first and second subqueries;
responsive to determining that the first subquery and the second subquery match based on the comparison:
generate a first database query specifying a where clause comprising a condition that evaluates to true for a superset of the first set of input rows and the second set of input rows;

generate a statement comprising the first database query, the statement storing result of execution of the first database query in a result table;

generate a first expression equivalent to the first subquery and a second expression equivalent to the second subquery, the first and the second expressions based on the result table;

modify the database query to use the result table, the modifying comprising, replacing the first subquery with the first expression and the second subquery with the second expression; and replace an execution of the database query with an execution of the statement followed by an execution of the modified database query.

14. The computer-implemented system of claim 13, wherein the first subquery returns a first set of columns and the second subquery returns a second set of columns, wherein the first database query returns a union of the first and second set of columns.

15. The computer-implemented system of claim 13, wherein the first subquery includes a group by clause based on a first set of columns and the second subquery includes a group by clause based on a second set of columns, wherein generating the statement comprises:

determining a union of the first set of columns and the second set of columns; and adding a group by clause to a query of the statement to group the result of the query by the union of the first and second set of columns.

16. The non-transitory computer-readable storage medium of claim 10, wherein the first expression is a query with the result table as input and the first where clause and the second expression is a query with the result table as input and the second where clause.

17. The non-transitory computer-readable storage medium of claim 10, wherein the first subquery specifies an order by clause and the second subquery also specifies the order by clause, wherein generating the statement comprises generating a query having the order by clause.

18. The non-transitory computer-readable storage medium of claim 10, the code further causing the processor to:

identify a third subquery matching a fourth subquery;

determine that the result of the third subquery is consumed by the first subquery and the result of the fourth subquery is consumed by the second subquery; and responsive to determining that the result of the third subquery is consumed by the first subquery and the result of the fourth subquery is consumed by the second subquery, exclude the third subquery and the fourth subquery from subqueries rewritten using reusable queries.

19. The non-transitory computer-readable storage medium of claim 10, the code further causing the processor to:

perform statistical analysis of the result table to determine statistical information describing the result table; and use the statistical information of the result table to optimize the database query execution.

20. The non-transitory computer-readable storage medium of claim 10, the code further causing the processor to:

specify a distribution of the result table based on a distribution of input tables of the database query.

\* \* \* \* \*